United States Patent
Watanabe

(10) Patent No.: US 10,737,310 B2
(45) Date of Patent: Aug. 11, 2020

(54) METHOD FOR MANUFACTURING SPRING MEMBER OF SEALING DEVICE

(71) Applicant: NOK CORPORATION, Tokyo (JP)

(72) Inventor: Mitsuo Watanabe, Kitaibaraki (JP)

(73) Assignee: NOK CORPORATION, Tokyo (JP)

( * ) Notice: Subject to any disclaimer, the term of this patent is extended or adjusted under 35 U.S.C. 154(b) by 240 days.

(21) Appl. No.: 16/102,794

(22) Filed: Aug. 14, 2018

(65) Prior Publication Data

US 2018/0354017 A1 Dec. 13, 2018

Related U.S. Application Data

(63) Continuation of application No. PCT/JP2017/002195, filed on Jan. 24, 2017.

(30) Foreign Application Priority Data

Feb. 18, 2016 (JP) .................................. 2016-028620

(51) Int. Cl.
*B21D 28/02* (2006.01)
*B21D 5/16* (2006.01)
(Continued)

(52) U.S. Cl.
CPC ............... *B21D 28/02* (2013.01); *B21D 5/16* (2013.01); *B21D 53/00* (2013.01); *F16J 15/3212* (2013.01); *F16J 15/3236* (2013.01)

(58) Field of Classification Search
CPC ........ B21D 28/02; B21D 28/10; B21D 28/22; B21D 28/26; B21D 5/16; B21D 5/00;
(Continued)

(56) References Cited

U.S. PATENT DOCUMENTS

| 2,434,484 A * | 1/1948 | Chambers, Jr. ...... F16J 15/3212 |
| | | 277/553 |
| 2,594,164 A * | 4/1952 | Hedberg ............. F16J 15/3212 |
| | | 267/1.5 |

(Continued)

FOREIGN PATENT DOCUMENTS

| AT | 190756 | 7/1957 |
| CN | 102892527 A | 1/2013 |

(Continued)

OTHER PUBLICATIONS

English translate (JPS49147457U), dated May 20, 2020.*

(Continued)

*Primary Examiner* — Adam J Eiseman
*Assistant Examiner* — Mohammed S. Alawadi
(74) *Attorney, Agent, or Firm* — Pearne & Gordon LLP

(57) ABSTRACT

An inner circle and outer periphery punching step is performed in which a punching process is performed on a plate material made of a metal material to form an outline on an outer periphery side and a circle space on an inner periphery side, thereby forming an intermediate plate material. In an inner periphery bending step, the intermediate plate material is subjected to a bending process of bending a portion inside of a base circle that is a circle between an inner circle end portion and an outer circle, toward one side. In an inner periphery punching step, the intermediate plate material is subjected to a punching process of punching out inner periphery radial portions that are portions radially extending from the inner circle end portion, to form inner periphery slits extending inside of the outer circle in respective radial pieces. In an outer periphery bending step, the intermediate plate material is subjected to a bending process of bending a portion outside of the base circle from the base circle toward the one side, thereby forming a spring member.

6 Claims, 8 Drawing Sheets

(51) Int. Cl.
*F16J 15/3236* (2016.01)
*F16J 15/3212* (2016.01)
*B21D 53/00* (2006.01)

(58) Field of Classification Search
CPC ........ B21D 53/00; B21D 11/20; B21D 51/06; F16J 15/3236; F16J 15/3212
USPC ...................................... 72/379.2, 334, 335
See application file for complete search history.

(56) References Cited

U.S. PATENT DOCUMENTS

| | | | | |
|---|---|---|---|---|
| 3,628,800 | A * | 12/1971 | Prasse | F16J 9/066 277/463 |
| 3,903,584 | A * | 9/1975 | Evans | B23P 13/00 29/450 |
| 4,133,542 | A * | 1/1979 | Janian | F16J 15/3212 277/555 |
| 4,291,567 | A * | 9/1981 | Murayama | B21D 51/383 72/335 |
| 4,508,356 | A * | 4/1985 | Janian | F16J 15/3236 277/555 |
| 7,490,503 | B1 * | 2/2009 | Kanemitsu | B21D 53/18 72/348 |
| 9,182,041 | B2 * | 11/2015 | Daub | H01M 2/1016 |
| 10,428,947 | B2 * | 10/2019 | Nakagawa | F16J 15/3212 |
| 2010/0194054 | A1 * | 8/2010 | Nishigaki | F16J 15/3256 277/549 |
| 2012/0067099 | A1 | 3/2012 | Hartl et al. | |
| 2012/0067240 | A1 | 3/2012 | Hartl et al. | |
| 2013/0043660 | A1 | 2/2013 | Daub et al. | |
| 2013/0056936 | A1 | 3/2013 | Prehn et al. | |
| 2016/0334017 | A1 | 11/2016 | Tadano | |
| 2017/0227337 | A1 | 8/2017 | Hartl et al. | |

FOREIGN PATENT DOCUMENTS

| | | | |
|---|---|---|---|
| CN | 102954217 A | 3/2013 | |
| CN | 103611780 A | 3/2014 | |
| CN | 204592290 U | 8/2015 | |
| CN | 105221915 A | 1/2016 | |
| EP | 2 559 922 A1 | 2/2013 | |
| GB | 541336 | 5/1941 | |
| JP | S49147457 U * | 12/1974 | ............... F16J 15/32 |
| JP | 2013-040683 A | 2/2013 | |
| JP | 2015-135137 A | 7/2015 | |
| JP | 2015-203491 A | 11/2015 | |
| WO | 2015/107760 A1 | 7/2015 | |

OTHER PUBLICATIONS

Extended European Search report dated Aug. 20, 2019 for corresponding European Application No. 17752900.5.
International Search Report for corresponding International Application No. PCT/JP2017/002195 dated Apr. 4, 2017.
Written Opinion for corresponding International Application No. PCT/JP2017/002195 dated Apr. 4, 2017.
Decision to Grant for corresponding Japanese Application No. 2017-523007 dated Jun. 12, 2017.
Chinese Office Action dated Nov. 16, 2018 for corresponding Chinese Application No. 201780010694.9 and English translation.
Written Opinion for corresponding International Application No. PCT/JP2017/002195 dated Apr. 4, 2017 and English translation.
International Preliminary Report on Patentability for corresponding International Application No. PCT/JP2017/002195 dated Aug. 21, 2018.

* cited by examiner

METHOD FOR MANUFACTURING SPRING MEMBER OF SEALING DEVICE

CROSS REFERENCE TO RELATED APPLICATIONS

The present application is a continuation application of International Application No. PCT/JP2017/002195, filed on Jan. 24, 2017, which claims priority to Japanese Patent Application No. 2016-028620, filed on Feb. 18, 2016. The contents of these applications are incorporated herein by reference in their entirety.

BACKGROUND

Technical Field

The present disclosure relates to a method for manufacturing a spring member of a sealing device, and particularly relates to a method for manufacturing a spring member of a sealing device for sealing an annular space between two members which are movable relative to each other.

Background Art

Conventionally, a sealing device has been used to seal an annular space between two members which are movable relative to each other, for example, an annular space between a motion member such as a shaft or a piston and a member covering the motion member on an outer periphery side, such as a housing or a cylinder. FIG. 7 is a partial cross-sectional view illustrating a schematic structure of a conventional sealing device of this kind. The conventional sealing device 100 shown in FIG. 7 is used by being fitted between an opening 112 of a housing 111 and a shaft 113 relatively movably inserted through the opening 112 in order to seal an annular space between the opening 112 of the housing 111 and the shaft 113. The sealing device 100 includes a lip member 101 made of a resin material such as PTFE (polytetrafluoroethylene) and having an annular shape about an axis, and a spring member 102 made of a metal material and having an annular shape about the axis. In the lip member 101, an outer periphery side lip 105 in an annular shape extends toward a high pressure side (a right side in FIG. 7) from an outer periphery side of an end portion, on the high pressure side, of a lip base portion 104 in an annular shape, an inner periphery side lip 106 in an annular shape also extends toward the high pressure side from an inner periphery side of the end portion of the lip base portion 104 on the high pressure side, and an accommodation groove 103 in an annular shape is formed that is recessed toward a low pressure side (a left side in FIG. 7) in a direction of the axis. The spring member 102 is an annular member having a substantially V-shape in a cross section as shown in FIG. 8, and is accommodated in the accommodation groove 103. Outer periphery pressing portions 107 of the spring member 102 extending in an inclined manner from the low pressure side toward the high pressure side and the outer periphery side contact the outer periphery side lip 105 from an inner periphery side, and inner periphery pressing portions 108 of the spring member 102 extending in an inclined manner from the low pressure side toward the high pressure side and the inner periphery side contact the inner periphery side lip 106 from the outer periphery side.

In a usage state of the sealing device 100, the outer periphery side lip 105 closely contacts the opening 112 of the housing 111, the inner periphery side lip 106 closely contacts the shaft 113, and the outer-periphery-side lip 105 and the inner-periphery-side lip 106 are pressed in a direction such that the outer-periphery-side lip 105 and the inner-periphery-side lip 106 approach each other by an interference width so that the spring member 102 is compressed. As a result, in the usage state of the sealing device 100, the outer periphery side lip 105 is pushed against the opening 112 of the housing 111 by a reaction force of the outer periphery pressing portions 107, and the inner periphery side lip 106 is also pushed against the shaft 113 by a reaction force of the inner periphery pressing portions 108; this ensures sealing of the space between the housing 111 and the shaft 113.

As a material of the lip member 101, PTFE has characteristics suitable for a lip member since PTFE can be used under high temperatures and high pressures and is also excellent in chemical resistance and oil resistance; however, PTFE is susceptible to plastic deformation (settling). Thus, it is difficult to maintain sealing performance (an interference) required of a lip member made of PTFE over a long period of time. The lip member made of PTFE is likely to have plastic deformation under high temperatures in particular, and, as such, a high temperature environment has a substantial impact on the sealing performance. For this reason, the sealing device 100 is provided with the spring member 102 as described above, the spring member 102 presses the lip member 101 and hence, the sealing performance of the sealing device 100 is maintained even when plastic deformation (settling) occurs in the lip member 101 due to high temperatures and the interference is reduced. However, when the sealing device 100 is used at a temperature close to a use limit temperature range on a high temperature side (about 260° C.), due to difference in linear expansion coefficients between a metal material of the housing 111 and a material of the lip member 101, the outer periphery side lip 105 may be strongly pushed against the housing 111 so that plastic deformation may occur in the outer periphery side lip 105, as a result of which the interference of the outer periphery side lip 105 with respect to the housing 111 may be reduced. For this reason, in the sealing device 100, rigidity of the outer periphery side lip 105 is lowered and thereby influence (degree of pressing) of the outer periphery pressing portions 107 of the spring member 102 with respect to the outer periphery side lip 105 is increased in order to compensate for the reduction in the interference of the outer periphery side lip 105 due to plastic deformation of the outer periphery side lip 105 under high temperatures (for example, see Japanese Patent Application Publication No. 2015-135137). Likewise, it is conceivable that rigidity of the inner periphery side lip 106 is lowered and thereby influence (degree of pressing) of the inner periphery pressing portions 108 of the spring member 102 with respect to the inner periphery side lip 106 is increased in order to compensate for the reduction in the interference of the inner periphery side lip 106 due to plastic deformation of the inner periphery side lip 106 under high temperatures.

As described above, while the sealing performance of the conventional sealing device 100 can be maintained by mitigating the effect of plastic deformation of the outer periphery side lip 105 and/or the inner periphery side lip 106 (hereinafter may be referred to as "lips 105, 106"), the rigidity of the lips 105, 106 is lowered such that the reaction force of the spring member 102 heavily acts on the lips 105, 106, and hence this may cause variation in contact states of the lips 105, 106. In the conventional spring member 102, an interval (a pitch interval) in a circumferential direction between portions of the spring member 102 respectively contacting the lips 105, 106 is wide as shown in FIG. 8, and respective portions of the lips 105, 106 contacted by the spring member 102 are applied with a heavy load, which results in a substantial variation in surface pressures in contact portions between the outer periphery side lip 105 and the housing 111 and between the inner periphery side lip 106 and the shaft 113. Accordingly, during a long period of use in particular, the interferences of the respective contact portions of the lips 105, 106 may become uneven due to the substantial variation in the surface pressures in these contact portions, and hence a contact portion with a low surface pressure may adversely affect the sealing performance.

In order to even out the surface pressures in the respective contact portions of the outer periphery side lip 105 and the inner periphery side lip 106, it is conceivable to narrow the pitch intervals between the outer periphery pressing portions 107 and the pitch intervals between the inner periphery pressing portions 108. The spring member 102 is manufactured by performing a punching process on a flat plate to form portions corresponding to the outer periphery pressing portions 107 and the inner periphery pressing portions 108, and thereafter bending the portions corresponding to the outer periphery pressing portions 107 and the inner periphery pressing portions 108. In the punching process, a plate piece to be punched out is required to have a width sufficiently larger than a thickness of a flat plate subjected to the process (typically three times the thickness of the flat plate). Further, in the flat plate having undergone the punching process, a pitch interval between portions corresponding to adjacent inner periphery pressing portions 108 becomes wide as a result of the portions corresponding to the inner periphery pressing portions 108 being bent. Thus, in the sealing device 100, the pitch interval between the inner periphery pressing portions 108 is wider than a punching width required for the punching process, and this causes variation in the surface pressure in the contact portion of the inner periphery side lip 106 of the sealing device 100, which in turn may result in deterioration in sealing performance of the inner periphery side lip 106.

Thus, the conventional sealing device 100 has been required to narrow the pitch interval between the inner periphery pressing portions 108 to allow for suppressing deterioration in sealing performance of the inner periphery side lip 106 while suppressing deterioration in sealing performance due to plastic deformation of the lip member 101 caused by use under high temperatures.

The present disclosure is related to providing a method for manufacturing a spring member of a sealing device that allows narrowing of a pitch interval between inner periphery pressing portions.

SUMMARY

A method for manufacturing a spring member of a sealing device according to the present disclosure is a method for manufacturing a spring member of a sealing device comprising an inner circle and outer periphery punching step, an inner periphery bending step, an inner periphery punching step and an outer periphery bending step. The inner circle and outer periphery punching step includes an inner circle punching step and an outer periphery punching step. The inner circle punching step is performed by punching a circle portion out of a plate material made of a metal material to form an inner circle end portion having an inner circle defining a circle space. The outer periphery punching step is performed by punching, out of the plate material, a portion outside of an outer circle that is a circle outside of the inner circle end portion, and outer periphery radial portions that are portions radially extending outside of the inner circle end portion up to the outer circle to form a plurality of radial pieces aligned radially. The inner periphery bending step, in the plate material having undergone the inner circle and outer periphery punching step is performed by bending a portion inside of a base circle that is a circle between the inner circle end portion and the outer circle, from the base circle toward one side that the plate material faces. The inner periphery punching step, in the plate material having undergone the inner periphery bending step, is performed by punching out inner periphery radial portions that are portions radially extending from the inner circle end portion to inside of the outer circle, to divide the inner circle end portion and form a slit in each of the radial pieces, the slit extending inside of the outer circle. And the outer periphery bending step, in the plate material having undergone the inner periphery punching step, is performed by bending a portion outside of the base circle from the base circle toward the one side.

In the method for manufacturing a spring member of a sealing device according to an aspect of the present disclosure, in the inner circle and outer periphery punching step, the outer periphery radial portions are portions radially extending outside of the inner circle end portion up to the outer circle at equal angle intervals, and the radial pieces are aligned at equal angle intervals.

In the method for manufacturing a spring member of a sealing device according to an aspect of the present disclosure, in the inner periphery punching step, the inner periphery radial portions are portions radially extending from the inner circle at equal angle intervals.

In the method for manufacturing a spring member of a sealing device according to an aspect of the present disclosure, in the inner periphery punching step, a width in a circumferential direction of a portion to be punched out in the inner circle end portion and each of the radial pieces to form the slit is not more than 1 mm.

In the method for manufacturing a spring member of a sealing device according to an aspect of the present disclosure, in the inner periphery punching step, a portion to be punched out in each of the radial pieces to form the slit is positioned at a center of a width of each of the radial pieces in the circumferential direction.

In the method for manufacturing a spring member of a sealing device according to an aspect of the present disclosure, in the inner circle and outer periphery punching step, the inner circle punching step is performed together with the outer periphery punching step.

According to the method for manufacturing a spring member of a sealing device of the present disclosure, it is possible to narrow a pitch interval between inner periphery pressing portions.

BRIEF DESCRIPTION OF DRAWINGS

FIGS. 3A, 3B and 3C are diagrams for explaining an inner periphery bending step in the method for manufacturing a spring member according to the embodiment of the present disclosure, in which FIG. 3A is a perspective view of an intermediate plate material formed by the inner periphery bending step, FIG. 3B is a plan view of the intermediate plate material formed by the inner periphery bending step, and FIG. 3C is a cross-sectional view of the intermediate plate material formed by the inner periphery bending step in a cross section along an axis.

FIGS. 4A and 4B are diagrams for explaining an inner periphery punching step in the method for manufacturing a spring member according to the embodiment of the present disclosure, in which FIG. 4A is a perspective view of an intermediate plate material formed by the inner periphery punching step, and FIG. 4B is a plan view of the intermediate plate material formed by the inner periphery punching step.

FIGS. 5A, 5B and 5C are diagrams for explaining an outer periphery bending step in the method for manufacturing a spring member according to the embodiment of the present disclosure, in which FIG. 5A is a perspective view of the spring member formed by the outer periphery bending step, FIG. 5B is a plan view of the spring member formed by the outer periphery bending step, and FIG. 5C is a cross-sectional view of the spring member formed by the outer periphery bending step in a cross section along the axis.

DESCRIPTION OF EMBODIMENT

Hereinafter, an embodiment of the present disclosure will be described in detail with reference to the accompanying drawings.

Figure 1:
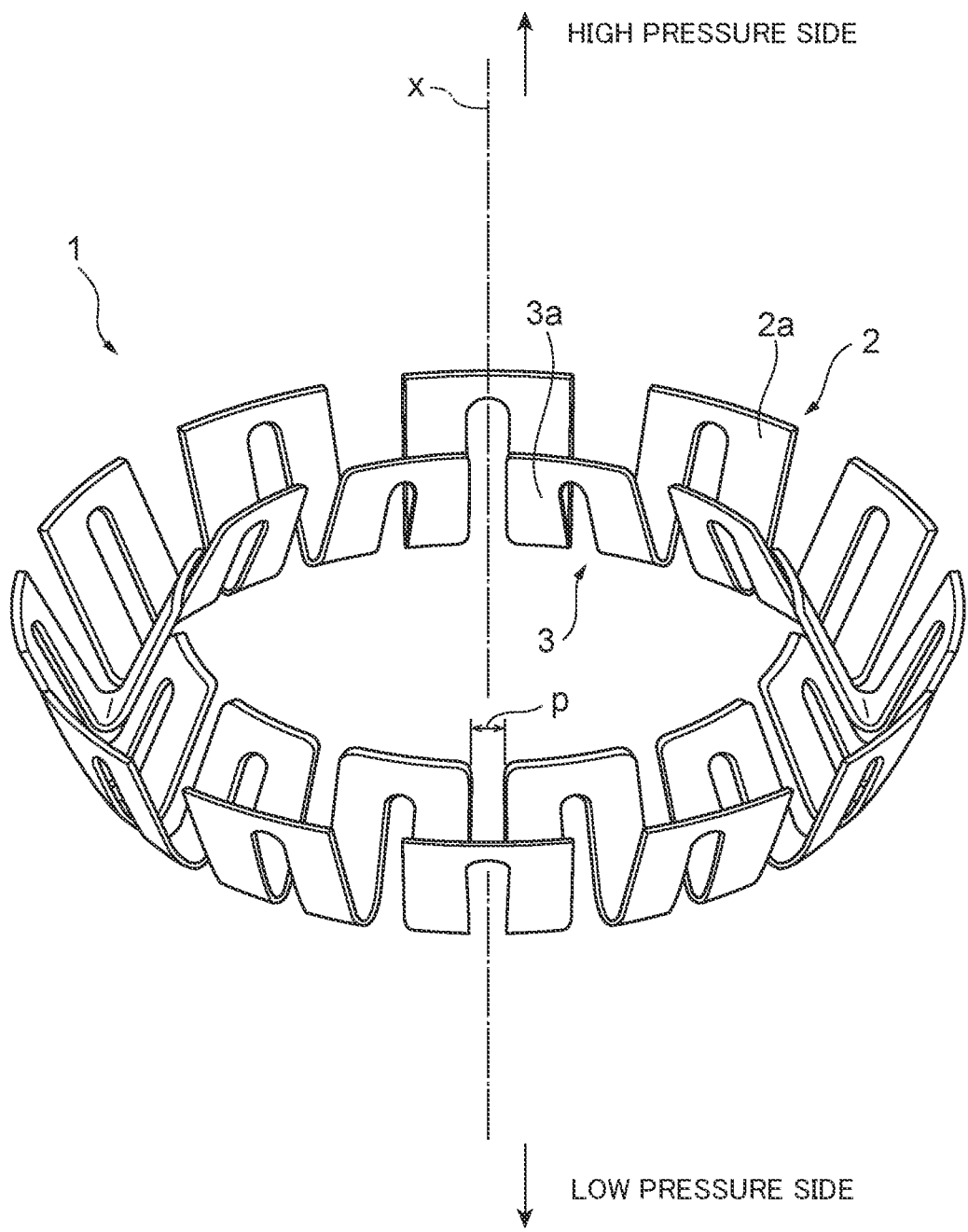
FIG. 1 is a perspective view of a spring member for illustrating a schematic structure of a spring member manufactured by the method for manufacturing a spring member of a sealing device according to an embodiment of the present disclosure.

FIG. 1 is a perspective view of a spring member for illustrating a schematic structure of the spring member manufactured by the method for manufacturing a spring member of a sealing device according to the embodiment of the present disclosure. As shown in FIG. 1, the spring member 1 manufactured by the method for manufacturing a spring member of a sealing device according to the embodiment of the present disclosure is a member having an annular shape about an axis x and manufactured from a plate material made of a metal material.

The spring member 1 includes plural outer periphery pressing portions 2 and plural inner periphery pressing portions 3; the outer periphery pressing portions 2 are arranged in an annular shape about the axis x, and the inner periphery pressing portions 3 are arranged in an annular shape about the axis x inside of the outer periphery pressing portions 2. The outer periphery pressing portions 2 and the inner periphery pressing portions 3 are connected to each other at one side in a direction of the axis x (at a lower side in FIG. 1) to be integrated with each other. The outer periphery pressing portions 2 are inclined toward the outer periphery side as the outer periphery pressing portions 2 extend toward another side in the axis x (at an upper side in FIG. 1), and the inner periphery pressing portions 3 are inclined toward the inner periphery side as the inner periphery pressing portions 3 extend toward the other side in the axis x. Specifically, the outer periphery pressing portions 2 are, for example, positioned in a circumferential direction centered about the axis x at equal angle intervals, and intervals (pitch intervals) between adjacent outer periphery pressing portions 2 are constant. Further, edge portions on the other side (free edge portions 2a) of the outer periphery pressing portions 2 are positioned on a circumference or substantially on a circumference centered about or substantially about the axis x. Also, specifically, the inner periphery pressing portions 3 are, for example, positioned in the circumferential direction centered about the axis x at equal angle intervals, and intervals (pitch intervals) between adjacent inner periphery pressing portions 3 are constant. Further, edge portions on the other side (free edge portions 3a) of the inner periphery pressing portions 3 are positioned on a circumference or substantially on a circumference centered about or substantially about the axis x.

As described later, in the sealing device, the spring member 1 is accommodated in an annular groove of a lip member made of a resin material, the outer periphery pressing portions 2 contact an outer periphery side lip of the lip member to press the outer periphery side lip, and the inner periphery pressing portions 3 contact an inner periphery side lip of the lip member to press the inner periphery side lip.

Figure 2:
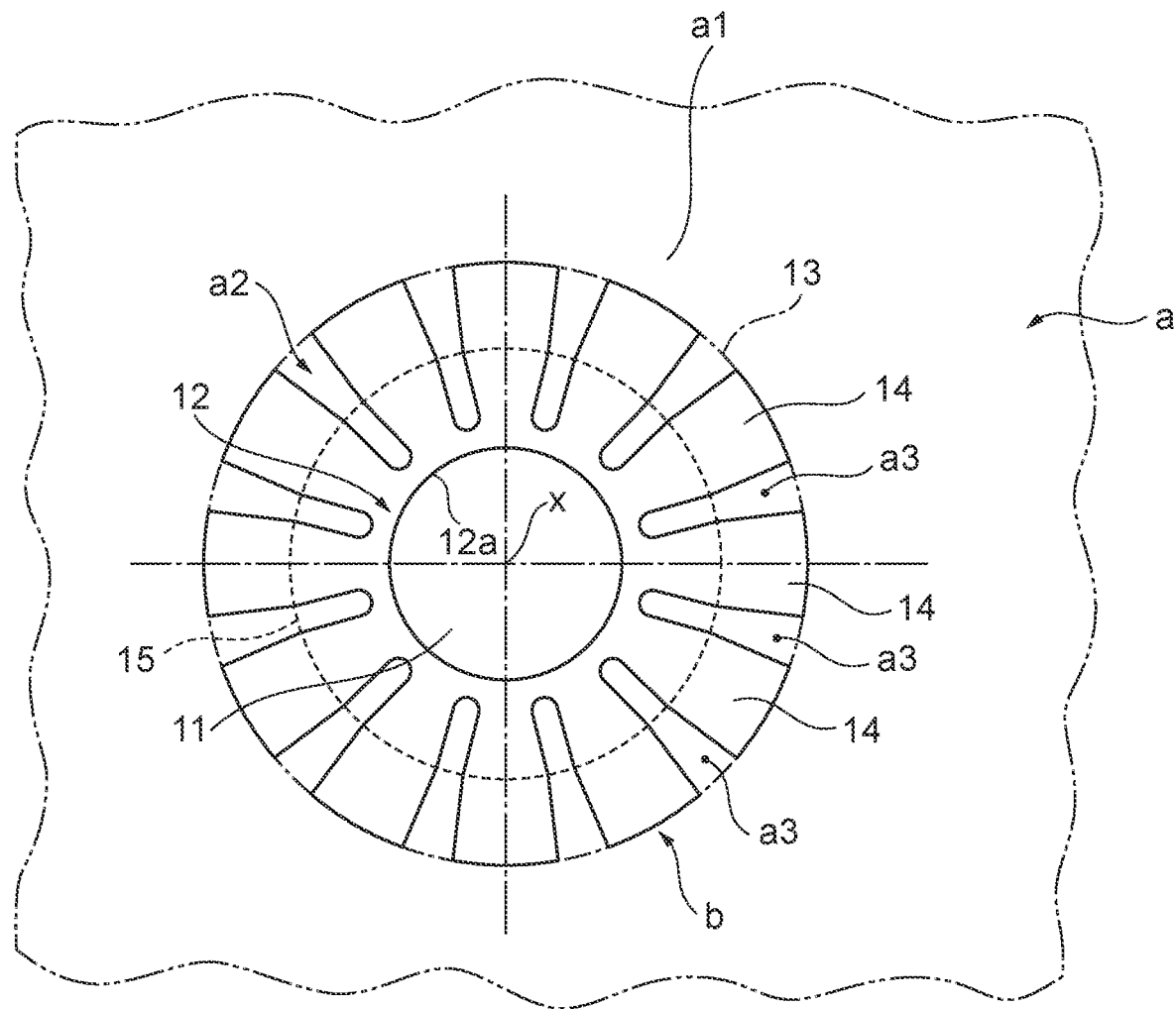
FIG. 2 is a diagram for explaining an inner circle and outer periphery punching step in the method for manufacturing a spring member according to the embodiment of the present disclosure.
Figure 3A:
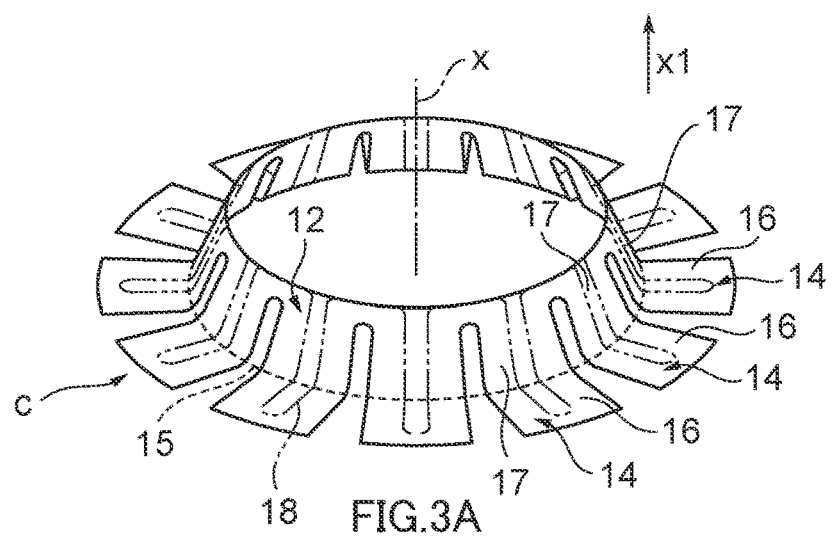
Figure 3B:
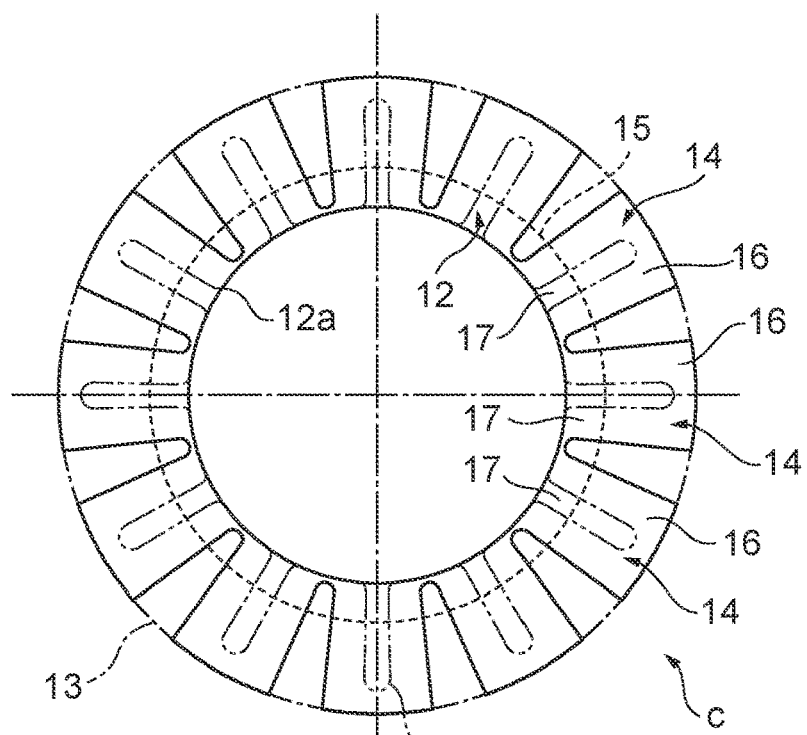
Figure 3C:
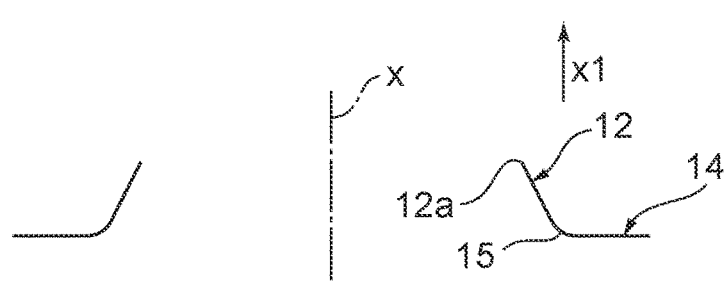
Figure 4A:
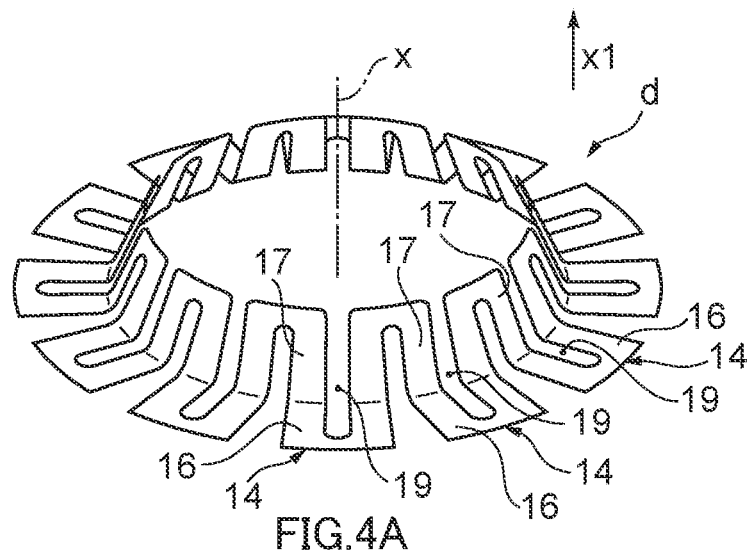
Figure 4B:
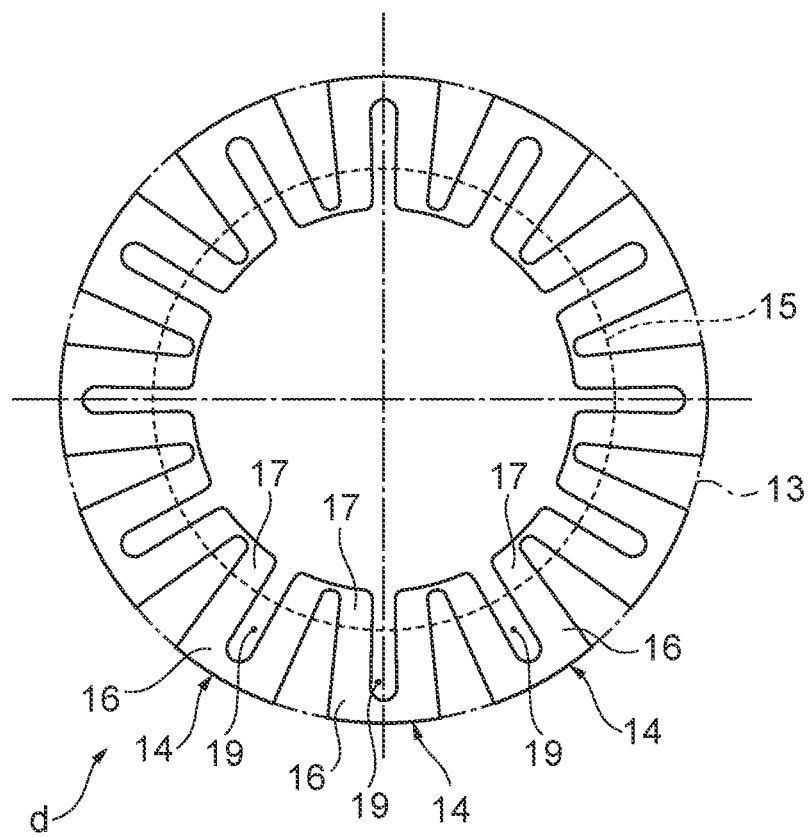
Figure 5A:
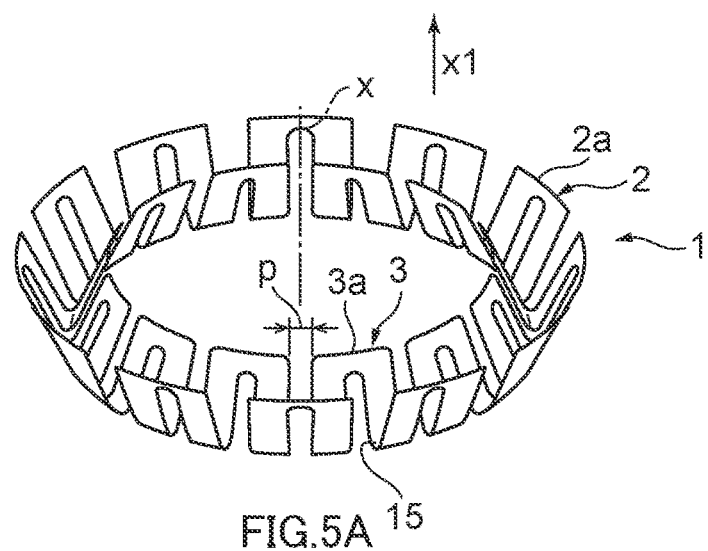
Figure 5B:
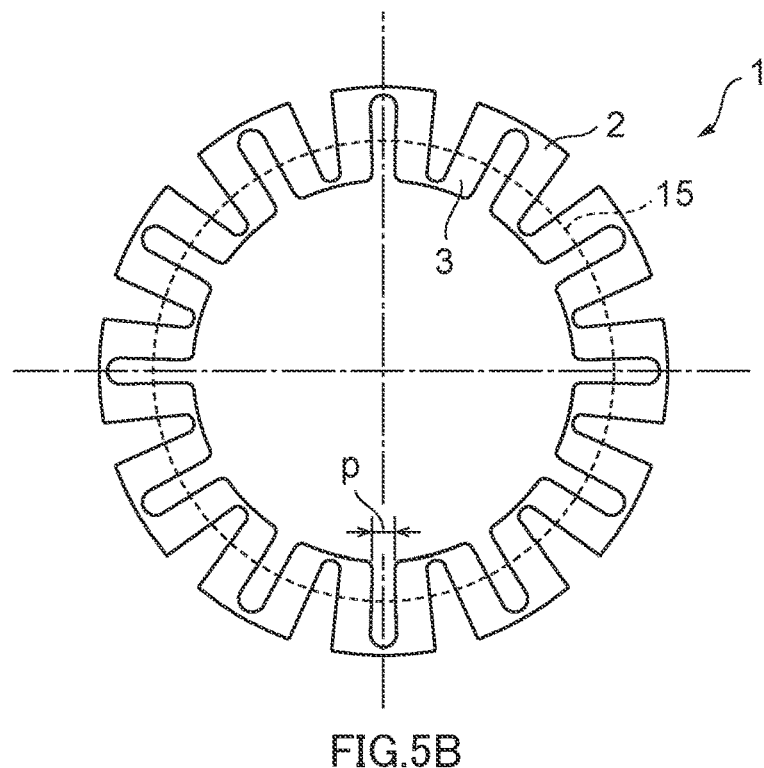

Next, the method for manufacturing a spring member of a sealing device according to the embodiment of the present disclosure will be explained. FIGS. 2, 3A, 3B, 3C, 4A, 4B, 5A, 5B and 5C are diagrams for explaining the method for manufacturing a spring member of a sealing device according to the embodiment of the present disclosure, in which FIG. 2 is a diagram for explaining an inner circle and outer periphery punching step in the method for manufacturing a spring member according to the present embodiment, FIGS. 3A, 3B and 3C are diagrams for explaining an inner periphery bending step in the method for manufacturing a spring member according to the present embodiment, FIGS. 4A and 4B are diagrams for explaining an inner periphery punching step in the method for manufacturing a spring member according to the present embodiment, and FIGS. 5A and 5B are diagrams for explaining an outer periphery bending step in the method for manufacturing a spring member according to the present embodiment.

In the method for manufacturing a spring member according to the present embodiment, first, a plate material a that is a plate material made of a metal material is prepared, and the plate material a is subjected to an inner circle and outer periphery punching step in which a punching process is performed on the plate material a to form an outline on an outer periphery side and a circle space on an inner periphery side and thereby to form an intermediate plate material b, as shown in FIG. 2. The metal material for the plate material a, for example, includes stainless steel. Also, the plate material a, for example, includes a flat plate material having a uniform or substantially uniform thickness. The inner circle and outer periphery punching step includes an inner circle punching step and an outer periphery punching step. In the inner circle punching step, a circle portion is punched out of the plate material a to form an inner circle end portion 12 that is a portion defining a circle space 11 that is a space in a circular shape. In the outer periphery punching step, a portion (a portion a1) outside of an outer circle 13, which is a circle outside of (on the outer periphery side of) the inner circle end portion 12, and outer periphery radial portions a2 that are portions outside of the inner circle end portion 12 and extending radially up to the outer circle 13, are punched out of the plate material a to form radial pieces 14 that are plural radially aligned portions.

Specifically, the circle space 11 is a space surrounded by an inner circle 12a that is a circle centered about or substantially centered about the axis x, which is a line perpendicular to or substantially perpendicular to a plane of the plate material a, and the outer circle 13 is a circle centered about or substantially centered about the axis x and including the inner circle 12a inside thereof. Also, the outer periphery radial portions a2 are portions formed by plural outer periphery radial portion pieces a3, and the outer periphery radial portion pieces a3 are portions extending in a radial direction from a circle outside of the inner circle 12a and centered about or substantially centered about the axis x, up to the outer circle 13. In the outer periphery radial portions a2, the plural outer periphery radial portion pieces a3 are aligned about the axis x at equal angle intervals or substantially equal angle intervals. As shown in FIG. 2, the outer periphery radial portion pieces a3 have, for example, a shape in which a width in a direction perpendicular to the radial direction is constant from the inner circle 12a toward an outer side up to a predetermined position, and is then gradually wider toward the outer side. The radial pieces 14 are formed correspondingly to the outer periphery radial portions a2; specifically, the radial pieces 14 extend along the radial direction from the inner circle end portion 12 toward the outer side, and have, for example, a shape in which a width in a direction perpendicular to the radial direction is gradually wider from the inner circle end portion 12 toward the outer side up to a predetermined position, and then becomes a constant width. Also, the plural radial pieces 14 are formed so as to be aligned about the axis x at equal angle intervals or substantially equal angle intervals. Outer side edges of the radial pieces 14 along the outer circle 13 correspond to the free edge portions 2a of the outer periphery pressing portions 2 of the spring member 1. In the present embodiment, as shown in FIG. 2, the outer periphery radial portions a2 include twelve outer periphery radial portion pieces a3, and twelve radial pieces 14 are formed. In the present embodiment, the radial pieces 14 of the above described shape and number are formed in the outer periphery radial portions a2; however, the shape and number of the radial pieces 14 are not limited to these, and the radial pieces 14 may have any shape and number that allows pressing of the lip member in a desired manner in the sealing device. That is, the shape of the outer periphery radial portions a2 to be punched out is set according to the shape and number of the radial pieces 14 to be formed.

In the inner circle and outer periphery punching step, the inner circle punching step and the outer periphery punching step are performed, and the order of performing the inner circle punching step and the outer periphery punching step may be any order. That is, the inner circle punching step and the outer periphery punching step may be simultaneously performed, or the inner circle punching step may be performed prior to the outer periphery punching step, or the inner circle punching step may be performed after the outer periphery punching step.

Subsequently, an inner periphery bending step is performed on the intermediate plate material b having undergone the inner circle and outer periphery punching step, thereby to form an intermediate plate material c shown in FIGS. 3A, 3B and 3C. FIGS. 3A, 3B and 3C are diagrams for explaining the inner periphery bending step, in which FIG. 3A is a perspective view of the intermediate plate material c formed by the inner periphery bending step, FIG. 3B is a plan view of the intermediate plate material c formed by the inner periphery bending step, and FIG. 3C is a cross-sectional view of the intermediate plate material c formed by the inner periphery bending step along the axis x.

In the inner periphery bending step, a bending process is performed on the intermediate plate material b formed by the inner circle and outer periphery punching step so as to bend a portion inside of a base circle 15 (see FIGS. 2, 3A and 3B) that is a circle between the inner circle end portion 12 and the outer circle 13, from the base circle 15 toward one side (in a direction of an arrow x1 in FIG. 3A) that the intermediate plate material b (the plate material a) faces.

Specifically, in the inner periphery bending step, the bending process is performed on the portion of the intermediate plate material b inside of the base circle 15 such that the portion of the intermediate plate material b inside of the base circle 15 has a nozzle shape projecting toward the x1 direction side. As shown in FIG. 3C, a shape of a cross section (hereinafter referred to as a cross-sectional shape) of the intermediate plate material c along the axis x is such that a portion up to a predetermined distance from the base circle 15 to the x1 side in the axis x is curved to protrude inward, and a portion on the x1 side relative to this portion of the predetermined distance is inclined to the axis x side and extends linearly or substantially linearly. Also, a cross-sectional shape of the intermediate plate material c in a plane perpendicular to the axis x on the x1 side relative to the base circle 15 in the axis x has a shape along a circle or an approximate circle centered or substantially centered about the axis x, and has a shape along a circle or an approximate circle whose diameter gradually decreases from the base circle 15 toward the x1 side in the axis x. That is, the portion of the intermediate plate material c on the x1 side relative to the above portion of the predetermined distance in the axis x has a shape along a conical or substantially conical surface that shrinks toward the x1 side and is centered or substantially centered about the axis x.

In the intermediate plate material c, outer periphery pressing portion corresponding portions 16 that are portions of the radial pieces 14 not bent by the bending process toward the x1 side correspond to the outer periphery pressing portions 2 of the spring member 1 shown in FIG. 1, and inner periphery pressing portion corresponding portions 17 that are portions consisting of portions of the radial pieces 14 bent by the bending process toward the x1 side and the inner circle end portion 12 correspond to the inner periphery pressing portions 3 of the spring member 1 shown in FIG. 1. As described above, a part of the inner periphery pressing portion corresponding portions 17 has a shape along a conical or substantially conical surface; however, a cross-sectional shape of the inner periphery pressing portion corresponding portions 17 may have an entirely curved shape protruding inward without a linear part, and the inner periphery pressing portion corresponding portions 17 may have a shape along a tapered surface.

Thereafter, an inner periphery punching step is performed on the intermediate plate material c having undergone the inner periphery bending step, thereby to form an intermediate plate material d shown in FIGS. 4A and 4B. FIGS. 4A and 4B are diagrams for explaining the inner periphery punching step, in which FIG. 4A is a perspective view of the intermediate plate material d formed by the inner periphery punching step, and FIG. 4B is a plan view of the intermediate plate material d formed by the inner periphery punching step.

In the inner periphery punching step, a punching process is performed on the intermediate plate material c formed by the inner periphery bending step to punch out inner periphery radial portions 18 that are portions extending radially from the inner circle end portion 12 (see FIGS. 3B and 4B), thereby to form, in respective radial pieces 14, inner periphery slits 19 that are slits extending inside of the outer circle 13. The inner periphery radial portions 18 to be punched out of the intermediate plate material c in the inner periphery punching step are portions consisting of portions to be removed from the respective radial pieces 14 to form the inner periphery slits 19, and for example, are portions radially extending from the inner circle end portion 12 at equal angle intervals. Through this inner periphery punching step, the inner periphery pressing portions 3 of the spring member 1 (see FIG. 1) are formed.

Specifically, in the inner periphery punching step, in the respective radial pieces 14 of the intermediate plate material c, the inner periphery slits 19 are formed so that the inner periphery slits 19 extend along the axis x from the inner circle 12a through the inner circle end portion 12 to a position not reaching the outer circle 13. In other words, the inner periphery slit 19 in each radial piece 14 extends along a projected line of the axis x on each radial piece 14. Also, the portions of the inner periphery radial portions 18 to be punched out of the respective radial pieces 14 extend from the inner periphery pressing portion corresponding portions 17 to the outer periphery pressing portion corresponding portions 16 in the respective radial pieces 14, and do not reach an outer periphery side end along the outer circle 13 in the outer periphery pressing portion corresponding portions 16, but extend to a position at a predetermined distance from the outer periphery side end toward the inner periphery side. The inner periphery slit 19 is preferably formed so as to be positioned at a center of a width of each radial piece 14 in a direction of circumference centered about the axis x (hereinafter may be referred to as a "circumferential direction"). Also, it is preferable that a width of the inner periphery slit 19 in the circumferential direction be constant along an extending direction that is a direction along the above-described projected line of the axis x. Since, it is allowed that a reaction force which is generated in response to a pressure in the radial direction is evened out over the width in the circumferential direction of each radial piece 14.

In the present embodiment, by the inner periphery punching step, the inner periphery slit 19 is formed in each radial piece 14 that extends along the center of the width or substantially along the center of the width of the radial piece 14 in the circumferential direction and that the inner periphery slit 19 has a constant or substantially constant width in the circumferential direction, as shown in FIGS. 4A and 4B. However, an outer periphery end portion of the inner periphery slit 19 in the outer periphery pressing portion corresponding portions 16 has a width in the circumferential direction that is not equal to or substantially equal to the width of another portion of the inner periphery slit 19 in the circumferential direction. For example, the outer periphery side end portion of the inner periphery slit 19 is configured to form a curved outline, and in the present embodiment, is configured to form a curved outline protruding toward the outer periphery side. The inner periphery radial portions 18 to be punched out of the intermediate plate material c by the inner periphery punching step have a shape corresponding to the inner periphery slits 19 so that the above-described inner periphery slits 19 are formed. The width of the inner periphery slit 19 in the circumferential direction is not more than 1 mm, for example. That is, the portions of the inner periphery radial portions 18 to be punched out in the respective radial pieces 14 each have a width of not more than 1 mm in the circumferential direction. As described later, the width of the inner periphery slit 19 in the circumferential direction is preferably as small as possible to improve sealing performance or prevent deterioration in sealing performance of the sealing device. A lower limit value for the width of the inner periphery slit 19 in the circumferential direction depends on, for example, a capacity of a device for performing the punching process in the inner periphery punching step.

Figure 5C:
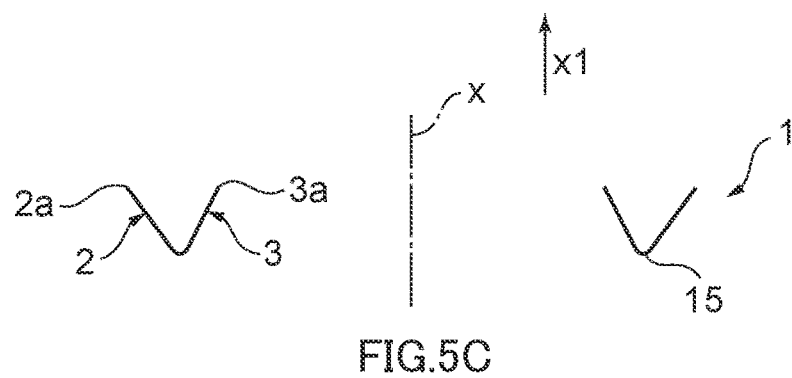

Thereafter, an outer periphery bending step is performed on the intermediate plate material d having undergone the inner periphery punching step, thereby to form the spring member 1 shown in FIGS. 5A, 5B and 5C. FIGS. 5A, 5B and 5C are diagrams for explaining the outer periphery bending step, in which FIG. 5A is a perspective view of the spring member 1 formed by the outer periphery bending step, FIG. 5B is a plan view of the spring member 1 formed by the outer periphery bending step, and FIG. 5C is a cross-sectional view of the spring member 1 formed by the outer periphery bending step.

In the outer periphery bending step, a bending process is performed on the intermediate plate material d formed by the inner periphery punching step to bend a portion outside of the base circle 15 (see FIG. 4B) in the direction of the arrow x1 from the base circle 15 toward the one side (see FIGS. 3A and 5A), similarly to the inner periphery bending step.

Specifically, in the outer periphery bending step, the bending process is performed on the outer periphery pressing portion corresponding portions 16, which are portions outside of the base circle 15 of the intermediate plate material d, such that the outer periphery pressing portion corresponding portions 16 have a trumpet shape projecting toward the x1 direction side. As shown in FIG. 5C, a cross-sectional shape of the outer periphery pressing portion corresponding portions 16 (the outer periphery pressing portions 2) bent in the outer periphery bending step is such that a portion up to a predetermined distance from the base circle 15 toward the x1 side in the axis x is curved to protrude outward and a portion on the x1 side relative to this portion of the predetermined distance is inclined to a side away from the axis x and extends linearly or substantially linearly. Also, a cross-sectional shape of the outer periphery pressing portion corresponding to portions 16 of the intermediate plate material d in a plane perpendicular to the axis x on the x1 side relative to the base circle 15 in the axis x has a shape along a circle or an approximate circle centered or substantially centered about the axis x, and has a shape along a circle or an approximate circle whose diameter gradually increases from the base circle 15 toward the x1 side in the axis x. That is, in the spring member 1, the portion on the x1 side relative to the above portion of the predetermined distance in the axis x has a shape along a conical or approximately conical surface centered or substantially centered about the axis x. A part of the outer periphery pressing portions 2, which are formed by bending the outer periphery pressing portion corresponding to portions 16 has a shape along a conical or approximately conical surface; however, a cross-sectional shape of the outer periphery pressing portions 2 may have an entirely curved shape protruding outward without a linear part, and the outer periphery pressing portions 2 may have a shape along a tapered surface.

As described above, the spring member 1 shown in FIGS. 1, 5A, 5B and 5C is manufactured by the method for manufacturing a spring member of a sealing device according to the embodiment of the present disclosure. As described above, in the method for manufacturing a spring member of a sealing device according to the present embodiment, the inner circle end portion 12 and the portions of the radial pieces 14 inside of the base circle 15 are bent to form the inner periphery pressing portion corresponding portions 17 in the inner periphery bending step prior to punching the inner periphery slits 19, and thereafter, the portions of the inner periphery radial portions 18 in the radial pieces 14 are punched out to form the inner periphery slits 19 in the inner periphery punching step, thereby forming the inner periphery pressing portions 3. In other words, in the intermediate plate material b formed by the inner circle and outer periphery punching step (see FIG. 2), the portions corresponding to the inner periphery pressing portions 3 are bent (see FIGS. 3A, 3B and 3C), and thereafter the inner circle end portion 12 is divided by forming the inner periphery slits 19 in the inner periphery punching step, thereby forming the inner periphery pressing portions 3. In this way, a pitch interval p, which is an interval between adjacent inner periphery pressing portions 3 of the spring member 1 in the circumferential direction, corresponds to the width of the inner periphery slit 19 in the circumferential direction, which is formed after the inner periphery bending step of bending the flat plate. Thus, the inner periphery slit 19 is not widened in the circumferential direction by the bending process and the like in the manufacturing process of the spring member, and the pitch interval p of the inner periphery pressing portions 3 can be narrowed compared to the pitch interval of a conventional spring member. For example, as described above, the width of the inner periphery slit 19 in the circumferential direction can be made not more than 1 mm, and the pitch interval p of the inner periphery pressing portions 3 can be made not more than 1 mm.

Thus, the method for manufacturing a spring member of a sealing device according to the embodiment of the present disclosure enables narrowing of the pitch interval p of the inner periphery pressing portions in the spring member of the sealing device.

Note that the punching process and the bending process performed in the above described method for manufacturing a spring member of a sealing device according to the embodiment of the present disclosure can be performed by a conventionally known device for performing a punching process and a conventionally known device for performing a bending process. For example, in the inner circle and outer periphery punching step, punching dies respectively corresponding to the portion a1 and the outer periphery radial portions a2 to be punched out are used so as to form the inner circle end portion 12 and the radial pieces 14, and in the inner periphery punching step, a punching die corresponding to the inner periphery radial portions 18 is used so as to form the inner periphery slits 19. Also, in the inner periphery bending step, a bending die by which the inner periphery pressing portions 3 are formed is used, and in the outer periphery bending step, a bending die by which the outer periphery pressing portions 2 are formed is used. The above-described method for manufacturing a spring member of a sealing device according to the embodiment of the present disclosure can be performed by a conventionally known device as described above, and a detailed explanation of the device for performing the method for manufacturing a spring member according to the present embodiment is omitted.

Also, the form of the spring member manufactured by the method for manufacturing a spring member of a sealing device according to the embodiment of the present disclosure is not limited to the form of the above-described spring member 1. The method for manufacturing a spring member of a sealing device according to the embodiment of the present disclosure may be used to manufacture any other well-known spring member of a sealing device.

The spring member manufactured by the method for manufacturing a spring member of a sealing device according to the present disclosure is used for a sealing device that is fitted into an annular space between two members which are movable relative to each other, to seal this space. Specifically, the spring member is fitted into an annular groove formed in an annular lip member that is equipped in the sealing device and made of resin, and, inside the space to be sealed, the spring member presses lips of the lip member respectively with the outer periphery pressing portions 2 and the inner periphery pressing portions 3 to push the lips against the respective two members and thereby seal the space.

Specifically, the sealing device for which the spring member manufactured by the method for manufacturing a spring member of a sealing device according to the present disclosure is used is used to seal an annular space between a motion member such as a reciprocating member, e.g. a shaft or a piston, an oscillating member or a rotating member, and a member covering the motion member on an outer periphery side, such as a housing or a cylinder. For example, the sealing device is used as a packing for an EGR valve disposed in an engine of a vehicle to seal a space between a shaft of the EGR valve and a housing.

Figure 6:
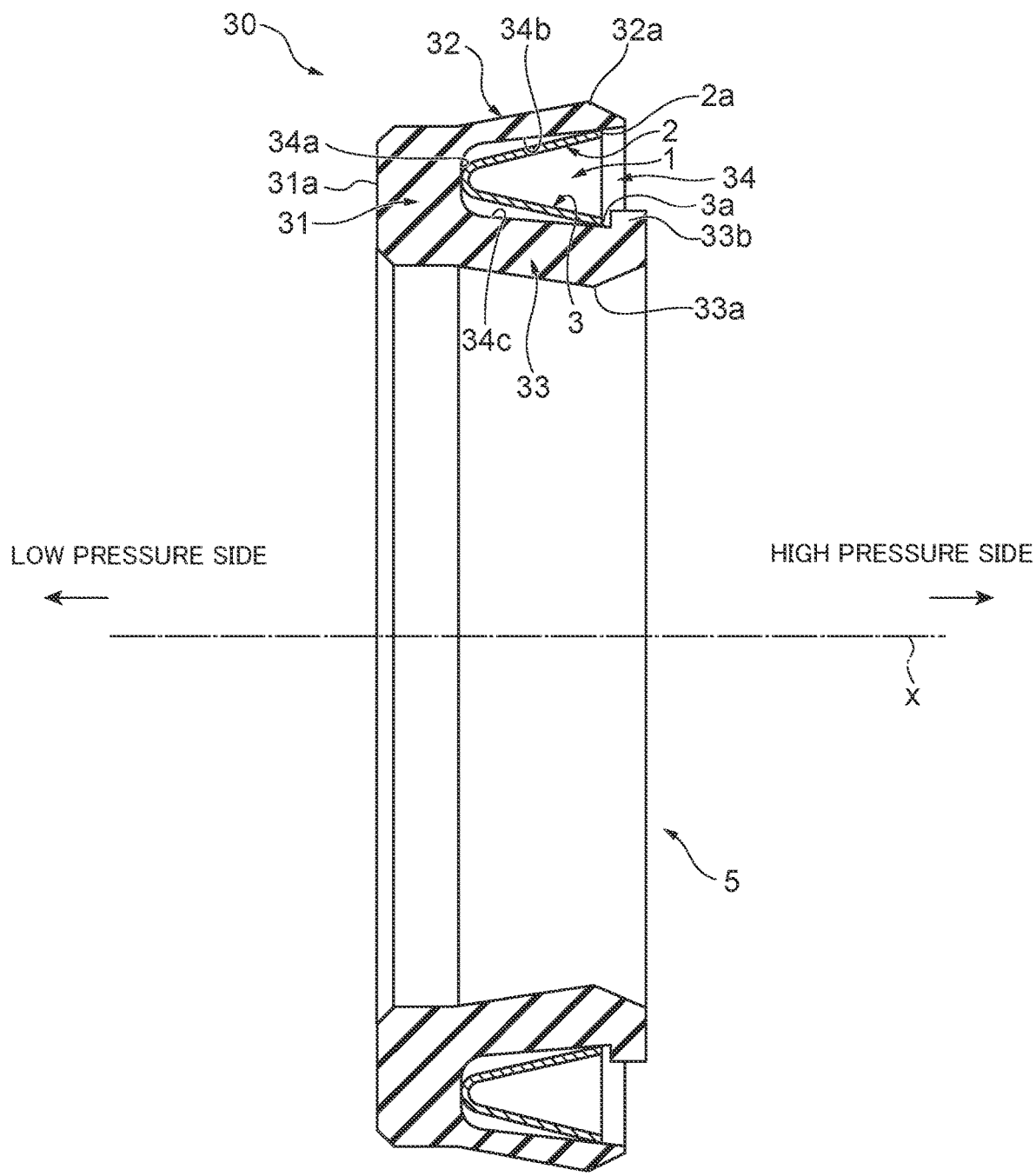
FIG. 6 is a cross-sectional view of a sealing device in a cross section along the axis for illustrating a schematic configuration of the sealing device including the spring member manufactured by the method for manufacturing a spring member of a sealing device according to the embodiment of the present disclosure.
Figure 7:
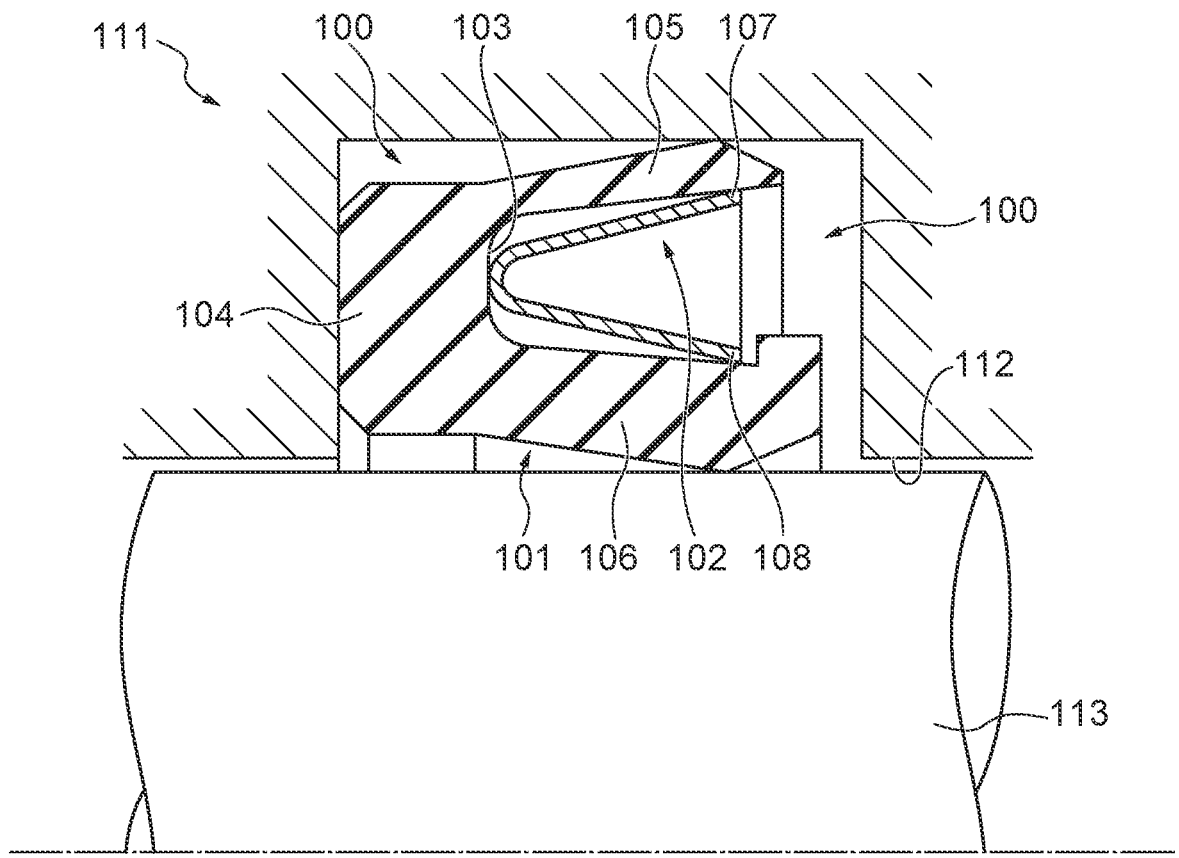
FIG. 7 is a partial cross-sectional view illustrating a schematic configuration of a conventional sealing device.
Figure 8:
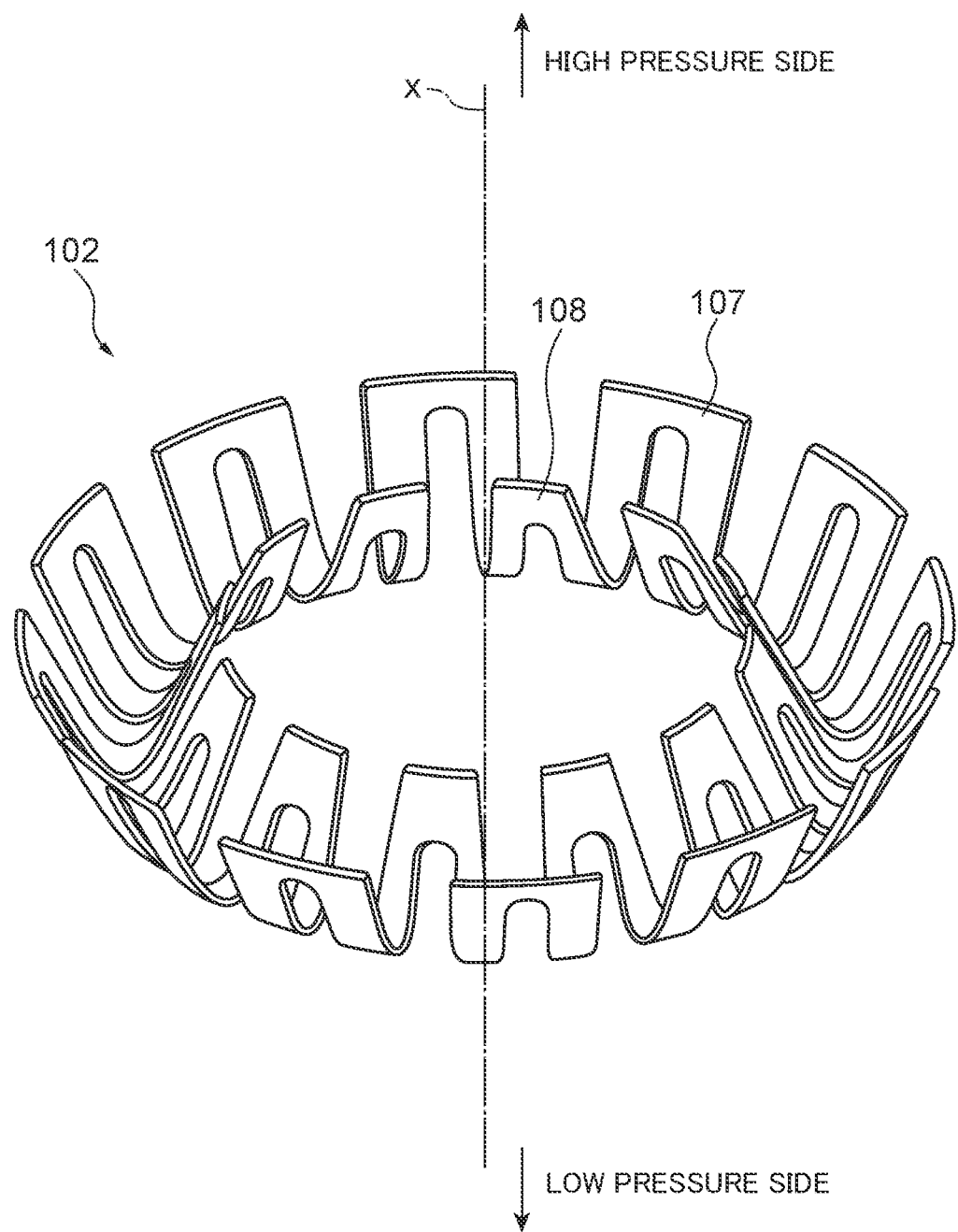
FIG. 8 is a perspective view for illustrating a schematic shape of a conventional spring member.

Next, an explanation will be given of a usage example of the spring member 1 manufactured by the above-described method for manufacturing a spring member of a sealing device according to the embodiment of the present disclosure. FIG. 6 is a cross-sectional view of a sealing device 5 in a cross section along the axis x for illustrating a schematic structure of the sealing device 5 including the spring member 1 manufactured by the above-described method for manufacturing a spring member of a sealing device according to the embodiment of the present disclosure.

As shown in FIG. 6, the sealing device 5 includes a lip member 30 that is a member having an annular shape about the axis x and is made of a resin material. Examples of the resin material of the lip member 30 include PTFE (polytetrafluoroethylene), polyamide or the like. More specifically, PTFE with a filler such as carbon fiber, glass fiber and bronze powders may be preferably used as the resin material of the lip member 30. The lip member 30 includes a lip base portion 31, an outer periphery side lip 32, and an inner periphery side lip 33, and an accommodation groove 34 that is an annular groove recessed from a high pressure side (a right side in FIG. 6) to a low pressure side (a left side in FIG. 6) is formed in the lip member 30.

The lip base portion 31 is a portion having an annular shape about the axis x. Specifically, as shown in FIG. 6, the lip base portion 31 has a cylindrical or circular shape centered about or substantially centered about the axis x, and a cross-sectional shape of the lip base portion 31 is rectangular or substantially rectangular. In the lip base portion 31, an end face 31a that is an end face at the low pressure side has a hollow disc surface spreading in a plane perpendicular to or substantially perpendicular to the axis x. Note that the cross-sectional shape of the lip base portion 31 may be of any other shape such as any other polygonal shape and a circle shape.

The outer periphery side lip 32 is an annular lip that extends toward the high pressure side from an outer periphery side of an end portion of the lip base portion 31 on the high pressure side, and is formed such that, in a usage state, an outer periphery side of the outer periphery side lip 32 closely contacts the housing. Specifically, as shown in FIG. 6, the outer periphery side lip 32 has a circular shape centered about or substantially centered about the axis x, and on the outer periphery side of the outer periphery side lip 32, a lip distal end portion 32a is formed that is a projection protruding toward the outer periphery side. In the outer periphery side lip 32, a width of the lip distal end portion 32a in a direction perpendicular to the axis x (hereinafter may be referred to as a "radial direction") is wider than a width, in the radial direction, of a root portion connecting to the lip base portion 31. The width of the outer periphery side lip 32 in the radial direction is not more than 0.7 mm for example. In the sealing device 5, the width of the outer periphery side lip 32 in the radial direction is smaller than a width of the inner periphery side lip 33 in the radial direction, as shown in FIG. 6. This allows an increase in the influence of a reaction force of the outer periphery pressing portions 2 with respect to the outer periphery side lip 32, thereby enabling prevention of deterioration in sealing performance due to plastic deformation of the outer periphery side lip 32. Note that the width of the inner periphery side lip 33 in the radial direction may be smaller than the width of the outer periphery side lip 32 in the radial direction. This allows an increase in the influence of a reaction force of the inner periphery pressing portions 3 with respect to the inner periphery side lip 33, thereby enabling prevention of deterioration in sealing performance due to plastic deformation of the inner periphery side lip 33. Also, both the width of the outer periphery side lip 32 in the radial direction and the width of the inner periphery side lip 33 in the radial direction may be smaller than a width, in the radial direction, of an outer periphery side lip or an inner periphery side lip of a conventional sealing device. This allows an increase in the influence of reaction forces of the outer periphery pressing portions 2 and the inner periphery pressing portions 3 respectively with respect to the outer periphery side lip 32 and the inner periphery side lip 33, thereby enabling prevention of deterioration in sealing performance due to plastic deformation of the outer periphery side lip 32 and the inner periphery side lip 33.

The inner periphery side lip 33 is an annular lip that extends toward the high pressure side from an inner periphery side of the end portion of the lip base portion 31 on the high pressure side, and is formed such that, in a usage state, an inner periphery side of the inner periphery side lip 33 closely contacts the shaft such that the shaft is slidable. Specifically, as shown in FIG. 6, the inner periphery side lip 33 has a circular shape centered about or substantially centered about the axis x, and on the inner periphery side of the inner periphery side lip 33, a lip distal end portion 33a is formed that is a projection protruding toward the inner periphery side. Further, in the inner periphery side lip 33, a projecting portion 33b is formed that is an annular portion projecting toward the outer periphery side from an inner peripheral surface at the end portion on the high pressure side, and the projecting portion 33b functions as a retainer for the spring member 1 accommodated in the accommodation groove 34, which will be described later.

In the lip member 30, the lip base portion 31, the outer periphery side lip 32 and inner periphery side lip 33 are integrally formed of the same material, and an end face of the lip base portion 31 on the high pressure side, a peripheral surface of the outer periphery side lip 32 on the inner periphery side and a peripheral surface of the inner periphery side lip 33 on the outer periphery side define the above-described accommodation groove 34. That is, the end face of the lip base portion 31 on the high pressure side forms a bottom surface 34a that is a bottom surface of the accommodation groove 34, the peripheral surface of the outer periphery side lip 32 on the inner periphery side forms an outer peripheral surface 34b that is a peripheral surface of the accommodation groove 34 on the outer periphery side, and the peripheral surface of the inner periphery side lip 33 on the outer periphery side forms an inner peripheral surface 34c that is a peripheral surface of the accommodation groove 34 on the inner periphery side.

In the sealing device 5, the spring member 1 is accommodated in the accommodation groove 34 of the lip member 30. As shown in FIG. 6, in the sealing device 5, a joining portion of the outer periphery pressing portions 2 and the inner periphery pressing portions 3 of the spring member 1 sits on (contacts) the bottom surface 34a of the accommodation groove 34, the outer periphery pressing portions 2 contact the outer peripheral surface 34b of the accommodation groove 34 at the free edge portions 2a and the vicinity of the free edge portions 2a, and the inner periphery pressing portions 3 contact the inner peripheral surface 34c of the accommodation groove 34 at the free edge portions 3a and the vicinity of the free edge portions 3a.

It is preferable that a length, an inclination angle and the like of the outer periphery pressing portions 2 of the spring member 1 are set such that the outer periphery pressing portions 2 contact the outer peripheral surface 34b of the accommodation groove 34 at a position opposed to the lip distal end portion 32a of the outer periphery side lip 32 on a back side or at the vicinity of the position, and likewise, it is preferable that a length, an inclination angle and the like of the inner periphery pressing portions 3 of the spring member 1 are set such that the inner periphery pressing portions 3 contact the inner peripheral surface 34c of the accommodation groove 34 at a position opposed to the lip distal end portion 33a of the inner periphery side lip 33 on a back side or at the vicinity of the position. Further, a length in an extending direction and an inclination angle with respect to the axis x are set for each of the outer periphery pressing portions 2 and the inner periphery pressing portions 3 such that the outer periphery pressing portions 2 and the inner periphery pressing portions 3 generate desired reaction forces in a usage state, which will be described later. Here, the inclination angle of the outer periphery pressing portions 2 refers to an angle at which the extending direction of the outer periphery pressing portions 2 (a projected line of the axis x onto the outer periphery pressing portions 2) is inclined with respect to the axis x, and the inclination angle of the inner periphery pressing portions 3 refers to an angle at which the extending direction of the inner periphery pressing portions 3 (a projected line of the axis x onto the inner periphery pressing portions 3) is inclined with respect to the axis x.

As described above, the projecting portion 33b is formed in the lip member 30 at the end portion of the inner periphery side lip 33 on the high pressure side, and in the sealing device 5, the projecting portion 33b is positioned on the high pressure side relative to the free edge portions 3a of the inner periphery pressing portions 3 of the spring member 1 as shown in FIG. 6. Thus, when the spring member 1 moves toward the high pressure side in the accommodation groove 34, the free edge portions 3a of the inner periphery pressing portions 3 abut on the projecting portion 33b of the inner periphery side lip 33, thereby making it impossible for the spring member 1 to move further toward the high pressure side. In this way, the projecting portion 33b of the inner periphery side lip 33 functions as a stopper to stop the spring member 1 from moving in a direction toward the high pressure side. Note that the projecting portion 33*b* may be provided to the outer periphery side lip 32. The projecting portion 33*b* as a stopper may be provided to either or both of the outer periphery side lip 32 and the inner periphery side lip 33.

In a usage state of the sealing device 5 where the sealing device 5 is mounted to mounted members such as a shaft and a housing, the outer periphery side lip 32 and the inner periphery side lip 33 are pressed in a direction closer to each other, and the outer periphery pressing portions 2 and the inner periphery pressing portions 3 of the spring member 1 are pressed in a direction closer to each other. In the sealing device 5, by the reaction force of the outer periphery pressing portions 2 against the pressing toward the inner periphery side, the outer periphery side lip 32 is pressed toward the outer periphery side in the radial direction, and thereby pushed against the mounted member (e.g., an opening portion of the housing). Also, in the sealing device 5, by the reaction force of the inner periphery pressing portions 3 against the pressing toward the outer periphery side, the inner periphery side lip 33 is pressed toward the inner periphery side in the radial direction, and thereby pushed against the mounted member (e.g., the shaft). In this way, the sealing of the annular space between the mounted members is ensured.

As described above, by the method for manufacturing a spring member of a sealing device according to the embodiment of the present disclosure, the pitch interval p between inner periphery pressing portions of the spring member can be made narrower than the pitch interval of a conventional spring member. Thus, the pitch interval p between the inner periphery pressing portions 3 of the spring member 1 is narrower than the pitch interval of a conventional spring member, and the inner periphery pressing portions 3 can contact the inner periphery side lip 33 over a wide area in the circumferential direction, and this allows suppression of variation in surface pressures in the lip distal end portion 33*a* of the inner periphery side lip 33, which contacts the mounted member, and to even out the surface pressure in the lip distal end portion 33*a*. As a result, with the sealing device 5 including the spring member 1 manufactured by the method for manufacturing a spring member of a sealing device according to the embodiment of the present disclosure, deterioration in sealing performance of the inner periphery side lip 33 can be suppressed while suppressing deterioration in sealing performance due to plastic deformation of the lip member 30 caused by use under high temperatures. To even out the surface pressure in the lip distal end portion 33*a*, the pitch interval p between the inner periphery pressing portions 3 (the width of the inner periphery slit 19 in the circumferential direction) is preferably as narrow as possible. As described above, by the method for manufacturing a spring member of a sealing device according to the present embodiment, the pitch interval p between the inner periphery pressing portions 3 can be made not more than 1 mm.

Note that the configuration of the sealing device for which the spring member manufactured by the method for manufacturing a spring member of a sealing device according to the embodiment of the present disclosure is used is not limited to the above-described configuration of the sealing device 5; the spring member manufactured by the method for manufacturing a spring member of a sealing device according to the embodiment of the present disclosure can be used for any applicable sealing device.

The embodiment of the present disclosure has been explained in the foregoing; however, the present disclosure is not limited to the method for manufacturing a spring member of a sealing device according to the above-described embodiment of the present disclosure, and includes all embodiments falling within the gist of the present disclosure and the scope of the claims. Also, the configurations may be selectively combined as appropriate to solve at least a part of the above described problems or to achieve at least a part of the above described effects.

What is claimed is:

1. A method for manufacturing a spring member of a sealing device, the method comprising:
    an inner circle and outer periphery punching step that includes an inner circle punching step and an outer periphery punching step, the inner circle punching step punching a circle portion out of a plate material made of a metal material to form an inner circle end portion having an inner circle defining a circle space, the outer periphery punching step punching, out of the plate material, a portion outside of an outer circle that is a circle outside of the inner circle end portion, and outer periphery radial portions that are portions radially extending outside of the inner circle end portion up to the outer circle, to form a plurality of radial pieces aligned radially;
    an inner periphery bending step that, in the plate material having undergone the inner circle and outer periphery punching step, bends a portion inside of a base circle that is a circle between the inner circle end portion and the outer circle, from the base circle toward one side that the plate material faces;
    an inner periphery punching step that, in the plate material having undergone the inner periphery bending step, punches out inner periphery radial portions that are portions radially extending from the inner circle end portion to inside of the outer circle, to divide the inner circle end portion and form a slit in each of the radial pieces, the slit extending inside of the outer circle; and
    an outer periphery bending step that, in the plate material having undergone the inner periphery punching step, bends a portion outside of the base circle from the base circle toward the one side.

2. The method for manufacturing a spring member of a sealing device according to claim 1, wherein in the inner circle and outer periphery punching step, the outer periphery radial portions are portions radially extending outside of the inner circle end portion up to the outer circle at equal angle intervals, and the radial pieces are aligned at equal angle intervals.

3. The method for manufacturing a spring member of a sealing device according to claim 1, wherein in the inner periphery punching step, the inner periphery radial portions are portions radially extending from the inner circle at equal angle intervals.

4. The method for manufacturing a spring member of a sealing device according to claim 1, wherein in the inner periphery punching step, a width in a circumferential direction of a portion to be punched out in the inner circle end portion and each of the radial pieces to form the slit is not more than 1 mm.

5. The method for manufacturing a spring member of a sealing device according to claim 1, wherein in the inner periphery punching step, a portion to be punched out in each of the radial pieces to form the slit is positioned at a center of a width of each of the radial pieces in the circumferential direction.

6. The method for manufacturing a spring member of a sealing device according to claim 1, wherein in the inner circle and outer periphery punching step, the inner circle punching step is performed together with the outer periphery punching step.

\* \* \* \* \*